(12) United States Patent
Vu et al.

(10) Patent No.: US 12,006,222 B2
(45) Date of Patent: Jun. 11, 2024

(54) METHOD FOR THE MANUFACTURE OF MICROWAVE-REDUCED GRAPHENE OXIDE

(71) Applicant: ArcelorMittal, Luxembourg (LU)

(72) Inventors: Thi Tan Vu, Oviedo (ES); Oscar Perez Vidal, Oviedo Asturias (ES); Juan Jose Arribas, Aviles (ES); David Noriega Perez, Asturias (ES); Roberto Suarez Sanchez, Aviles Asturias (ES)

(73) Assignee: ArcelorMittal, Luxembourg (LU)

( * ) Notice: Subject to any disclaimer, the term of this patent is extended or adjusted under 35 U.S.C. 154(b) by 522 days.

(21) Appl. No.: 17/272,779

(22) PCT Filed: Jul. 9, 2019

(86) PCT No.: PCT/IB2019/055835
§ 371 (c)(1),
(2) Date: Mar. 2, 2021

(87) PCT Pub. No.: WO2020/049373
PCT Pub. Date: Mar. 12, 2020

(65) Prior Publication Data
US 2021/0214232 A1 Jul. 15, 2021

(30) Foreign Application Priority Data

Sep. 5, 2018 (WO) .................. PCT/IB2018/056764

(51) Int. Cl.
*C01B 32/198* (2017.01)
*B01J 21/18* (2006.01)

(52) U.S. Cl.
CPC ............. *C01B 32/198* (2017.08); *B01J 21/18* (2013.01)

(58) Field of Classification Search
CPC ... C01B 32/198; C01B 32/194; C01B 32/184; C01B 32/182; C01B 32/186; C01B 32/188; C01B 32/19; C01B 32/192; C01B 32/196; C01B 2204/00; C01B 2204/02; C01B 2204/04; C01B 2204/06; C01B 2204/065; C01B 2204/20; C01B 2204/22;
(Continued)

(56) References Cited

U.S. PATENT DOCUMENTS

| | | |
|---|---|---|
| 2007/0235450 A1 | 10/2007 | Quantrille et al. |
| 2016/0332886 A1 | 11/2016 | Zhang et al. |
| 2019/0276319 A1* | 9/2019 | Chhowalla .............. C01B 32/23 |

FOREIGN PATENT DOCUMENTS

| | | |
|---|---|---|
| CN | 103058177 A | 4/2013 |
| CN | 106629689 A | 5/2017 |

(Continued)

OTHER PUBLICATIONS

Jakhar, et al., Microwave reduction of graphene oxide, Carbon 2020; 170: 277-293 (Year: 2020).*
(Continued)

*Primary Examiner* — Daniel C. McCracken
(74) *Attorney, Agent, or Firm* — Davidson Kappel LLC

(57) ABSTRACT

A method for the manufacture of microwave-reduced graphene oxide (MW-rGO) including: the provision of graphene oxide (GO), the reduction of GO into reduced graphene oxide (rGO) using a reducing agent and the reduction of rGO into MW-rGO by microwaving under air atmosphere in presence of a catalyst.

16 Claims, 1 Drawing Sheet

(58) Field of Classification Search
CPC ............ C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; B01J 21/18; B01J 19/126; Y02E 60/13

See application file for complete search history.

(56) References Cited

FOREIGN PATENT DOCUMENTS

| JP | 2013050301 A | | 3/2013 | |
|---|---|---|---|---|
| JP | 2018067494 A | | 4/2018 | |
| KR | 20170021549 | * | 2/2017 | ............ Y02E 60/13 |
| KR | 20170021549 A | | 2/2017 | |
| WO | WO2018/044762 A1 | | 3/2018 | |
| WO | WO 2018/044762 | * | 8/2018 | ............ C01B 31/04 |

OTHER PUBLICATIONS

Li, et al., Ultrafast, dry microwave synthesis of graphene sheets, J. Mater. Chem. 2010; 20: 4781-4783 (Year: 2010).*

Liu, et al., A Catalytic Microwave Process for Superfast Preparation of High-Quality Reduced Graphene Oxide, Angew. Chem. Int. Ed. 2017; 56: 15677-15682 (Year: 2017).*

International Search Report of PCT/IB2019/055835, dated Oct. 24, 2019.

D. Voiry et al, "High-quality graphene via microwave reduction of solution-exfoliated graphene oxide", Science, US, (Sep. 1, 2016), vol. 353, No. 6306, doi:10.1126/science.aah3398, ISSN 0036-8075, pp. 1413-1416.

D. Voiry et al., "Supplementary Materials for High-quality graphene via microwave reduction of solution-exfoliated graphene oxide", Science, (Sep. 1, 2016), vol. 353, No. 6306.

Zhu Y et al, "Microwave assisted exfoliation and reduction of graphite oxide for ultracapacitors", Carbon, Elsevier, Oxford, GB, vol. 48, No. 7, ISSN 0008-6223, (Jun. 1, 2010), pp. 2118-2122, (Feb. 4, 2010).

Runze Liu et al.,"A Catalytic Microwave Process for Superfast Preparation of High-Quality Reduced Graphene Oxide" Angew. Chem. In. Ed. 2017, 56, 15 pages.

Park et al.: "Effects of nanofluids containing graphene/graphene-oxide nanosheets on critical heat flux"; Applied Physics Letters, Jul. 12, 2010 American Institute of Physics, 2 Huntington Quadrangle, Melville, NY 11747; vol. 97, Nr: 2, p. 23103, Jul. 13, 2010.

Dongwoo et al.: "Oxidation Resistance of Iron and Copper Foils Coated with Reduced Graphene Oxide Multilayers," ACS Nano, Sep. 25, 2012 American Chemical Society, vol. 6, Nr: 9, pp. 7763-7769.

Rafiee et al.: "Wetting transparency of graphene," Nature Materials, Mar. 1, 2012 Nature Publishing Group UK, London; vol. 11, Nr: 3, pp. 217-222.

* cited by examiner

METHOD FOR THE MANUFACTURE OF MICROWAVE-REDUCED GRAPHENE OXIDE

The present invention relates to the manufacture of microwave-reduced graphene oxide (MW-rGO). In particular, MW-rGO will have applications in metal industries including steel, aluminum, stainless steel, copper, iron, copper alloys, titanium, cobalt, metal composite, nickel industries, for example as coating or as a cooling reagent.

BACKGROUND

Graphene can be fabricated by several methods such as mechanical exfoliation of graphite, chemical vapor deposition or epitaxial growth. However, it is very difficult to fabricate Graphene at large scale using the mentioned methods since the management of the reactions are difficult to handle at industrial scale.

It is known to produce reduced graphene oxide (rGO) by reducing graphene oxide (GO). Reduced graphene oxide is composed of one or a few layers of graphene sheets containing some oxygen functional groups. Thanks to its interesting properties such as a high thermal conductivity and a high electrical conductivity, reduced graphene oxide, being hydrophobic, has many applications.

For example, reduced Graphene Oxide can be produced by chemical process such as a reduction of graphene oxide using a reducing agent such as hydrazine, ascorbic acid, urea, NaOH or by mechanical process such as thermal reduction at high temperature in an inert atmosphere. However, rGO with low oxygen content, i.e lower than 10%, is very difficult to obtain. Indeed, chemical or mechanical processes usually provides rGO having more than 10% of oxygen groups. Some oxygens groups such as epoxy groups are very difficult to reduce with conventional methods. In addition, the obtained rGO contains lot of defects thus demonstrating very low electrical conductivity.

The patent application publication WO2018/044762 discloses a method for producing microwave-reduced graphene oxide (MW-rGO), comprising:
(a) providing graphene oxide;
(b) reducing the graphene oxide to obtain reduced graphene oxide (rGO) wherein the reduction of oxygen concentration is sufficient to allow microwaves to be absorbed by the rGO; and
(c) microwaving the reduced graphene oxide until a microwave-reduced graphene oxide (MW-rGO) containing an oxygen concentration of about 5 atomic % or less is produced. The microwaving step is performed under inert atmosphere, for example under argon.

During the microwaving step, an electromagnetic field is produced by a microwave oven in the form of microwaves. The molecules present in rGO reach a plasma state, i.e. they breakdown into ions, due to very high temperature mostly caused by the strong electromagnetic field. Since the microwaving step is performed under inert atmosphere, no other molecules can reach the plasma state. Thus, the plasma state is more easily reached leading to a good reduction of rGO into MW-rGO.

SUMMARY OF THE INVENTION

Nevertheless, although the presence of inert gas such as argon makes plasma easier during microwaving step, the microwaving step performed under inert atmosphere is difficult to implement at industrial scale. Indeed, the management of the inert gas in a microwave oven leads to an important plant modification, an important maintenance and a high cost.

It is an object of the present invention to provide an easy to implement method for the manufacture of MW-rGO compared to the conventional methods. Additionally, another object is to provide an industrial method to obtain MW-rGO having a high quality in the shortest time possible.

The present invention provides a method for the manufacture of microwave-reduced graphene oxide (MW-rGO) comprising:
A. The provision of graphene oxide (GO) comprising one or a few layer(s) of graphene comprising at least 25% by weight of oxygen functional groups,
B. The reduction of GO into reduced graphene oxide (rGO), comprising one or a few layer(s) of graphene having between 10 and 25% by weight of oxygen functional groups, using a reducing agent and
C. the reduction of rGO into MW-rGO, comprising one or a few layer(s) of graphene having less than 10% by weight of oxygen functional groups, by microwaving rGO under air atmosphere in presence of a catalyst.

The following terms are defined:
Oxygen functional groups include ketone groups, carboxyl groups, epoxy groups and hydroxyl groups,
Graphite nanoplatelets means a multilayered system of graphene sheets having a thickness around between 5 and 20 nm,
Graphene nanoplatelet(s) means one or a few layer(s) of single-atom-thick sheet of hexagonally arranged, bonded carbon atoms, presenting usually a thickness below 5 nm, which can have some defects and
Pristine graphene means Graphene is in its original condition, i.e. ideal, and does not have any defects. Other characteristics and advantages of the invention will become apparent from the following detailed description of the invention.

BRIEF DESCRIPTION OF THE DRAWINGS

To illustrate the invention, various embodiments and trials of non-limiting examples will be described, particularly with reference to the following Figures.

DETAILED DESCRIPTION

Figure 1:
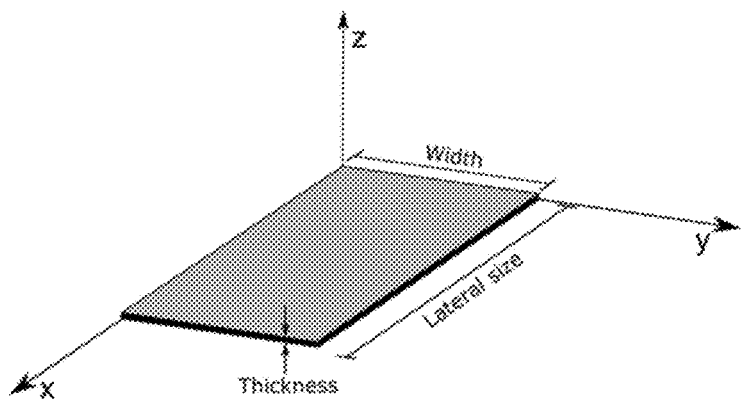
FIG. 1 illustrates an example of one layer of MW-rGO according to the present invention.

The invention relates to a method for the manufacture of microwave-reduced graphene oxide (MW-rGO) comprising:
A. The provision of graphene oxide (GO) comprising one or a few layer(s) of graphene comprising at least 25% by weight of oxygen functional groups,
B. The reduction of GO into reduced graphene oxide (rGO), comprising one or a few layer(s) of graphene having between 10 and 25% by weight of oxygen functional groups, using a reducing agent and
C. the reduction of rGO into MW-rGO, comprising one or a few layer(s) of graphene having less than 10% by weight of oxygen functional groups, by microwaving rGO under air atmosphere in presence of a catalyst.

Without willing to be bound by any theory, it seems that in step B), the reduction with a reducing agent is partial, i.e. all the oxygen functional groups cannot be reduced using a chemical reducing agent. Indeed, the inventors have found that the reducing agent can reduce the GO into a rGO comprising one or a few layer(s) of graphene having between 10 and 25% by weight of oxygen functional groups.

It is believed that step C) allows for the reduction of rGO into MW-rGO, comprising one or a few layer(s) of graphene having less than 10% by weight of oxygen functional groups thanks to the microwaving of rGO under air atmosphere in presence of a catalyst. Indeed, it is believed that when step C) is performed under air atmosphere with a catalyst, the catalyst improves the reduction of rGO into MW-rGO. Indeed, the catalyst can absorb, as a receptor, the electromagnetic field produced during step C), such electromagnetic field being in the form of microwaves. Then, the catalyst can convert the gas molecules present in air to reach the plasma state. rGO can thus be reduced by entering in contact with the gas molecules that reached the plasma state. Consequently, it has been found that even though step C) is not performed under inert atmosphere, it is possible to reduce into MW-rGO in a short time. Additionally, the method according to the present invention is easy to implement at industrial scale since no inert gas is needed in step C). Preferably, in step B), GO and the reducing agent are mixed together under agitation. For example, they are mixed under mechanical agitation.

Preferably, in step B), the reducing agent is chosen from: acid ascorbic; urea; hydrazine hydrate; alkaline solution such as NaOH or KOH; phenols such as gallic acid, tannin acid, dopamine or tea polyphenol; alcohols such as methyl alcohol, ethyl alcohol or isopropyl alcohol; glycine; sodium citrate or sodium borohydride. More preferably, the reducing agent is acid ascorbic since the ascorbic acid is more environmentally friendly.

After the reduction of GO into rGO, optionally rGO is washed. For example, rGO is washed with water.

rGO can be dried, for example with air or by lyophilization.

Advantageously, in step B), the reduction is performed at a temperature between 50 and 120° C., more preferably between 90 and 100° C.

Preferably, in step B), the reduction is performed during less 24 hours, more preferably during less than 15 hours and advantageously during 1 to 10 hours.

Preferably, in step C), the catalyst is chosen from: pristine graphene, graphene nanoplatelet(s), graphite or graphite nanoplatelets. More preferably, the catalyst is pristine graphene. Without willing to be bound by any theory, it is believed that pristine graphene can better absorb the electromagnetic field in the form of microwaves due to the nature, the form and the properties of pristine graphene. Indeed, pristine graphene, being conductive, is a single layer of Graphite consisting of carbons bonded together in a hexagonal honeycomb lattice. It is an allotrope of carbon in the structure of a plane of $sp^2$ bonded atoms with which microwaves are attracted and can easily be absorbed.

Preferably, in step C), the ratio in weight of rGO with respect to the catalyst is as follows:

$$50 \leq \frac{\text{amount of } rGO}{\text{amount of catalyst}} \leq 150.$$

Advantageously, the ratio in weight of rGO with respect to the catalyst is as follows:

$$75 \leq \frac{\text{amount of } rGO}{\text{amount of catalyst}} \leq 125.$$

Without willing to be bound by any theory, it is believed that when the ratio in weight of rGO with respect to the catalyst is as above, the reduction of rGO into MW-rGO is further improved. Indeed, this above ratio leads to MW-rGO having even fewer oxygen groups.

Preferably, in step C), the microwave frequency is between 300 MHz and 100 GHz, preferably between 1 and 5 GHz and for example, of 2.45 GHz.

Preferably, step C) is performed with a microwave frequency heating device. Preferably, it is a microwave oven.

Advantageously, the microwave has a power between 100 W and 100 kW, but more preferably between 100 and 2000 kW.

Preferably, in step C), the microwaving is performed during at least 2 seconds. Indeed, without willing to be bound by any theory, it is believed that when the microwaving is performed during at least 2 seconds, the reduction into MW-rGO is further improved.

By applying the method according to the present invention, Microwave-reduced graphene oxide (MW-rGO) comprising one or a few layer(s) of graphene having less than 10% by weight, more preferably less than 7%, by weight of oxygen functional groups is obtained.

Figure 2:
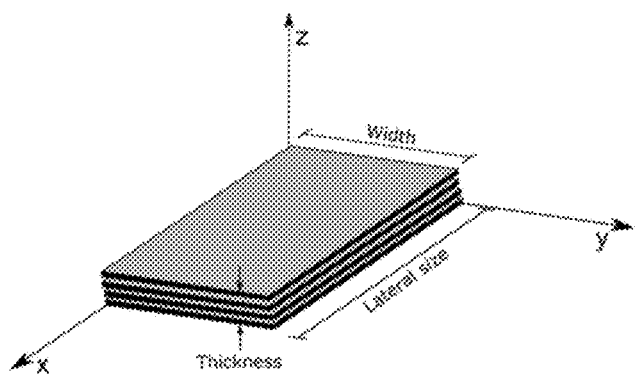
FIG. 2 illustrates an example of MW-rGO according to the present invention.

FIG. 1 illustrates an example of one layer of MW-rGO according to the present invention. The lateral size means the highest length of the layer through the X axis, the thickness means the height of the layer through the Z axis and the width of the nanoplatelet is illustrated through the Y axis. FIG. 2 illustrates an example of a few layers (here four) of MW-rGO according to the present invention.

Preferably, MW-rGO is deposited on metallic substrate steel to improve some properties such as corrosion resistance of a metallic substrate.

In another preferred embodiment, MW-rGO is used as cooling reagent. Indeed, graphene oxide can be added to a cooling fluid. Preferably, the cooling fluid can be chosen from among: water, ethylene glycol, ethanol, oil, methanol, silicone, propylene glycol, alkylated aromatics, liquid Ga, liquid In, liquid Sn, potassium formate and a mixture thereof. In this embodiment, the cooling fluid be used to cool down a metallic substrate. For example, the metallic substrate is selected from among: aluminum, stainless steel, copper, iron, copper alloys, titanium, cobalt, metal composite, nickel.

The invention will now be explained in trials carried out for information only. They are not limiting.

Examples

All Trials were prepared by providing 2.5 L of an aqueous solution comprising GO having 52% of oxygen functionals groups. The concentration of GO in the aqueous solution was of 2 g·L$^{-1}$. GO. This aqueous solution was mixed with 5 g of L-ascorbic acid under mechanical agitation during 3 hours at 95° C. to obtain rGO.

After the complete reduction of GO into rGO, rGO was washed with deionized water and lyophilized to obtain rGO powder. rGO had 17% of oxygens functionals groups.

Then, rGO was disposed in a microwave oven (800 W) under air atmosphere. Optionally, a catalyst being Pristine Graphene was added. rGO was reduced into MW-rGO by microwaving Table 1 shows the results obtained:

| Trials | Amount of rGO (mg) | Presence of catalyst - pristine graphene | Amount of catalyst (mg) | Ratio amount of rGO / amount of catalyst | Microwaving time (s) | Percentage of C in MW-rGO (wt. %) |
|---|---|---|---|---|---|---|
| 1 | 100 | no | — | — | 0 | 82 |
| 2 | 100 | no | — | — | 5 | 83 |
| 3 | 100 | no | — | — | 10 | 85 |
| 4 | 100 | no | — | — | 20 | 86 |
| 5 | 100 | no | — | — | 30 | 87 |
| 6 | 100 | no | — | — | 60 | 88 |
| 7 | 200 | no | — | — | 300 | 89 |
| 8 | 300 | no | — | — | 300 | 89 |
| 9* | 100 | yes | 1 | 100 | 5 | 94 |
| 10* | 100 | yes | 1 | 100 | 10 | 94 |
| 11* | 100 | yes | 0.5 | 200 | 5 | 90 |

*according to the present invention

Trials according to the present invention shows MW-rGO having less than 10% of oxygen groups in a low microwaving time.

What is claimed is:

1. A method for manufacturing microwave-reduced graphene oxide (MW-rGO) comprising:
   A. providing graphene oxide (GO) including at least one layer of graphene including at least 25% by weight of oxygen functional groups;
   B. reducing the GO into reduced graphene oxide (rGO) including at least one layer of graphene having between 10 and 25% by weight of oxygen functional groups, using a reducing agent; and
   C. reducing the rGO into MW-rGO, including at least one layer of graphene having less than 10% by weight of oxygen functional groups, by microwaving rGO under air atmosphere in presence of a catalyst.

2. The method as recited in claim 1 wherein in step B), the reducing agent is at least one of the group consisting of: acid ascorbic; urea; hydrazine hydrate; alkaline solution; phenols; alcohols; glycine; sodium citrate and sodium borohydride.

3. The method as recited in claim 1 wherein in step B), the reduction is performed a temperature between 50 and 120° C.

4. The method as recited in claim 1 wherein in step B), the reduction is performed during less than 24 hours.

5. The method as recited in claim 1 wherein in step C), the catalyst is at least one of the group consisting of: pristine graphene, graphene nanoplatelet(s), graphite and graphite nanoplatelets.

6. The method as recited in claim 5 wherein in step C), the catalyst is pristine graphene.

7. The method as recited in claim 1 wherein in step C), the ratio in weight of rGO with respect to the catalyst is as follows:

$$50 \leq \frac{\text{amount of } rGO}{\text{amount of catalyst}} \leq 150.$$

8. The method as recited in claim 7 wherein in step C), the ratio in weight of rGO with respect to the catalyst is as follows:

$$75 \leq \frac{\text{amount of } rGO}{\text{amount of catalyst}} \leq 125.$$

9. The method as recited in claim 1 wherein in step C), the microwave frequency is between 300 MHz and 100 GHz.

10. The method as recited in claim 9 wherein in step C), the microwave frequency is between 1000 MHz and 5000 MHz.

11. The method as recited in claim 1 wherein step C) is performed with a microwave frequency heating device.

12. The method as recited in claim 11 wherein the microwave frequency heating device is a microwave oven.

13. The method as recited in claim 1 wherein the microwave has a power between 100 W and 100 kW.

14. The method as recited in claim 1 wherein in step C), the microwaving is performed for at least 2 seconds.

15. The method as recited in claim 1 wherein the at least one layer of graphene includes a plurality of layers.

16. The method as recited in claim 1 wherein the plurality of layers is four or fewer.

* * * * *